Aug. 9, 1966 H. F. JEHRING 3,264,711
CUTTING TOOL
Filed Feb. 25, 1965 2 Sheets-Sheet 1
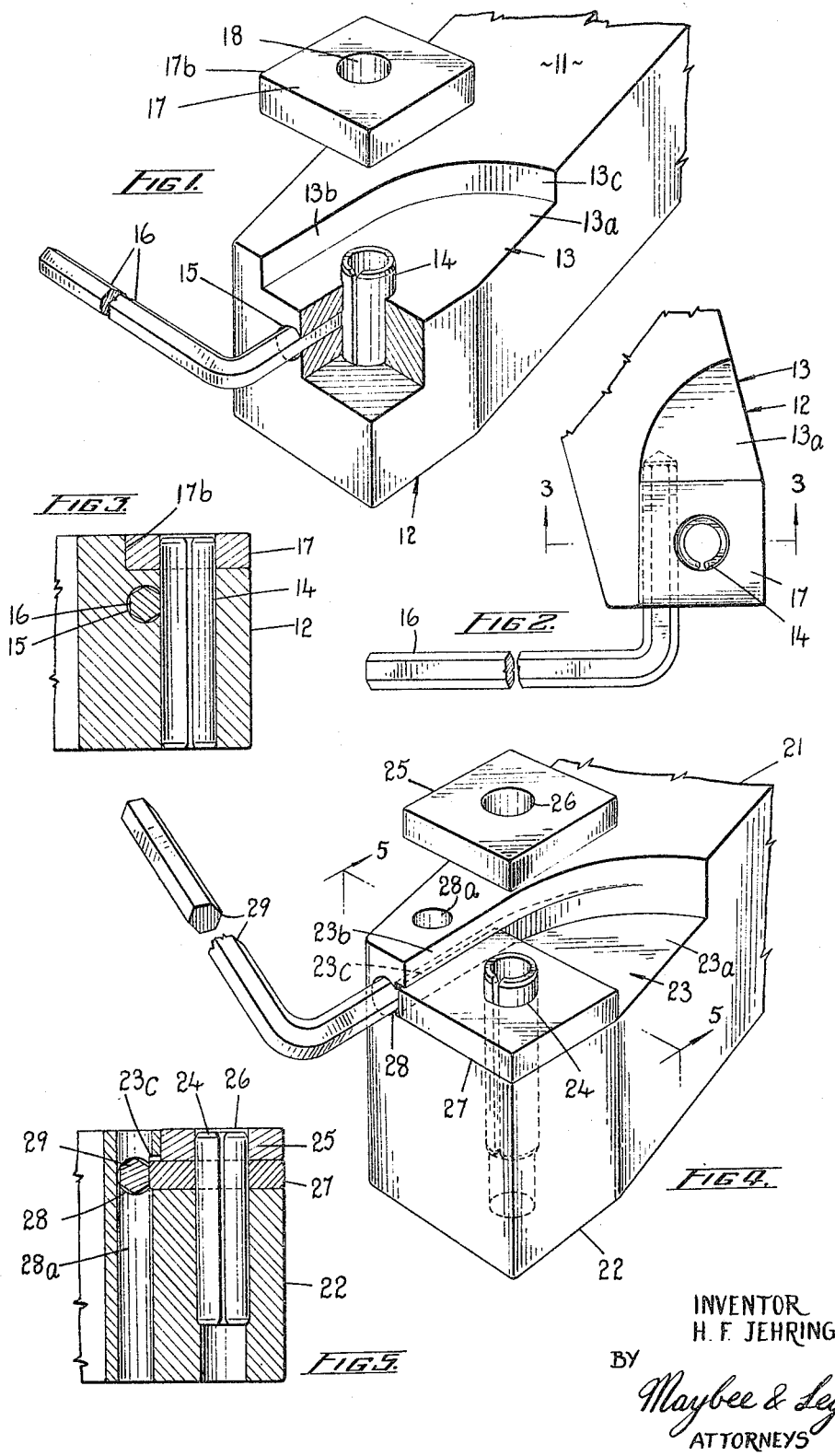
INVENTOR
H. F. JEHRING
BY
Maybee & Legris
ATTORNEYS Aug. 9, 1966  H. F. JEHRING  3,264,711

CUTTING TOOL

Filed Feb. 25, 1965  2 Sheets-Sheet 2

INVENTOR
H. F. JEHRING

Maybee & Legris
ATTORNEYS

United States Patent Office 3,264,711
Patented August 9, 1966

3,264,711
CUTTING TOOL
Herbert Friedrich Jehring, Oakville, Ontario, Canada, assignor to A. C. Wickman Limited, Toronto, Ontario, Canada
Filed Feb. 25, 1965, Ser. No. 435,171
9 Claims. (Cl. 29—96)

This invention relates to lathe and like cutting tools having replaceable cutting inserts, particularly carbide tips, capable of being moved or replaced to bring a fresh cutting edge into position when the edge previously in use no longer is serviceable.

The main object of the invention is to provide a cutting tool having simple means for securing in position the cutting insert, with any of its cutting edges in operative position, and which means conveniently can be manipulated to release quickly the secured insert.

The foregoing and still further objects and advantages of the invention will become apparent from a study of the following specification, taken in conjunction with the accompanying drawings, in which like reference characters indicate corresponding parts throughout the several views, and in which:

FIG. 1 is a fragmentary perspective view of a cutting tool constructed in accordance with the invention, with the cutting insert removed from its normal position and with a segment of the cutting tool broken away for greater clarity;

FIG. 2 is a fragmentary plan view of the cutting tool of FIG. 1;

FIG. 3 is a vertical section on the line 3—3 of FIG. 2;

FIG. 4 is a fragmentary perspective view of a second embodiment of a cutting tool constructed in accordance with the invention;

FIG. 5 is a vertical section on the line 5—5 of FIG. 4;

Figure 6:
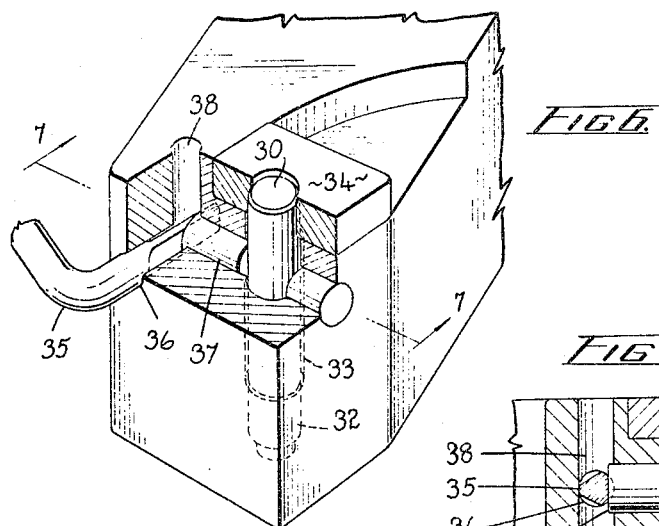
FIG. 6 is a fragmentary broken awoy perspective view of a third embodiment of a cutting tool constructed in accordance with the invention.

Referring to FIGS. 1, 2 and 3 of the drawings, a cutting tool embodying the invention comprises a tool holder having a shank 11 and a head generally indicated at 12. The shank 11 is adapted to be inserted and held in a tool post of a lathe or in the appropriate holder of some other cutting machine. On the upper face of the head is an open recess generally indicated at 13 and which is defined by a base 13a and by an abutment 13b which in the embodiment illustrated is a straight wall and fairs into a curved portion 13c.

A spring pin 14 is fast in a bore which extends within the head perpendicularly to the base 13, and it includes a free portion which projects above the base. The spring pin illustrated in FIGS. 1, 2 and 3 is of conventional elastic construction and is of the kind commonly known as a "roll-pin." Roll-pins are formed of sheet metal rolled into a tubular form which in cross-section is of split-ring shape, which permits them to contract when they are pinched or compressed and to expand when they are released.

Extending into the head transversely relative to the spring pin 14 is a hole or cylindrical bore 15, the position of which is so located that a segment of its periphery interferes with a portion of the surface of the spring pin. A cam-surfaced rod 16 which, for example, may be an Allen key is insertable in the bore 15 when it is angularly positioned to a first position, namely where a "flat" on the key faces the spring pin 14 as shown in FIGS. 1 and 3.

A cutting insert 17 normally rests in the open recess 13, with one of its opposed faces bearing on the base 13a of the recess and with a portion of its peripheral surface 17b bearing against the abutment 13b. Preferably, the cutting insert is so made that it is a true square, and a hole 18 extends through its center transversely of the opposed faces. When the cutting insert is positioned in the open recess, the free portion of the spring pin 14 registers in the hole 18.

In order to position the cutting insert in the open recess 13, the Allen key 16 is rotated by 30° relative to the position shown in FIGS. 1 and 3, namely to a "second position" as shown in FIG. 2. By so doing, one of the corners of the Allen key bears against and compresses the elastic wall of the spring pin 14, and thus the clearance between the spring pin and the abutment 13b is increased sufficiently to enable the cutting insert to be dropped into position. Needless to say, the location of the spring pin relative to the abutment 13b, and the dimensions of the cutting insert 17, have to be so selected and proportioned as to permit the cutting insert to fit accurately but with a slight amount of freedom in the open recess as the spring pin 14 registers with the hole 18 in the cutting insert.

If the Allen key then is returned to the position illustrated in FIGS. 1 and 3, the wall of the spring pin will be released, thus to urge the cutting insert into engagement with the abutment 13b, whereby it will be held snugly and securely.

In the embodiment of FIGS. 4 and 5 there is provided a cutting tool having a shank 21 and a head 22 in which is an open recess generally indicated at 23 and having a base 23a and a wall comprising an upper portion 23b which constitutes an abutment, and a recessed lower portion 23c. A spring pin 24 is secured in a bore provided in the head, and it has a free portion which extends above the base 23a.

A cutting insert 25 having a central hole 26 is positioned in the open recess, but interposed between the insert and the base 23a is a load-carrying element constituted by an anvil 27. One edge of the anvil registers with, and has freedom of movement in, the recessed wall portion 23c. Adjacent the recessed wall portion 23c is a bore 28; the bore 28 is so positioned relative to the adjacent portion of the peripheral surface of the anvil that the bore interferes with the said adjacent portion of the peripheral surface of the anvil. An Allen key 29 when angularly positioned to a "first position" so that one of its flats is parallel to the opposed edge of the anvil 27, may be inserted into the bore 28. Rotation of the Allen key by 30° from the position shown in FIG. 5 to the "second position" as illustrated in FIG. 4 will force the anvil away and thus compress the spring pin to an extent sufficient that the insert will be released from engagement with the wall 23b.

No novelty is claimed in the interposition per se of an anvil between the base of the recess and the insert. However, the peculiar arrangement whereby the anvil has the transitory function of transmitting the camming action of the Allen key to the spring pin, thus to compress the spring pin, is believed to be new.

It will be apparent from FIG. 5 that the bore 28 need not necessarily lie alongside the adjacent edge of the anvil. This bore may be substituted, for example, by a bore 29 which is at 90° thereto.

Figure 7:
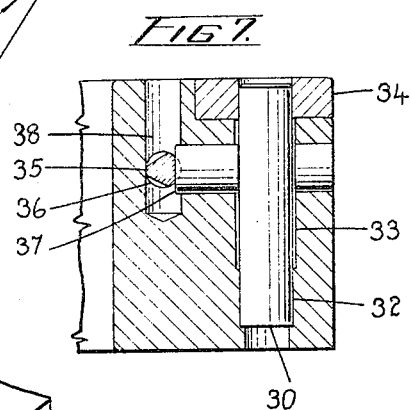
FIG. 7 is a fragmentary vertical section on the line 7—7 of FIG. 6.

The description of the cutting tool illustrated in FIGS. 6 and 7 will be limited to the features whereby it differs from the cutting tool illustrated in FIGS. 1, 2 and 3.

A solid spring pin 30 is substituted for the roll-pin type of spring pin. Thus, the bore in the head 31 within which the solid pin 30 is positioned, of necessity comprises a lower portion 32 in which the spring pin is force-fitted, and an upper portion 33 of somewhat larger diameter in which the spring pin is free to deflect.

In order to deflect the spring pin 30 so as to enable a cutting insert 34 to be released therefrom, a key 35 which, in cross-section, is a triangle having rounded corners is inserted in a bore 36 and then is rotated, as described in connection with the other embodiments. However, instead of the key 35 exerting its cam action by direct engagement with the spring pin, it bears against a load carrying element or plunger 37 positioned in a suitable passage and interposed between the bore 36 and the spring pin 30. Thus, wear on the spring pin due to rubbing action of the key is eliminated completely, and wear on the key is reduced considerably, since there now is line contact between the key and the plunger, rather than the point contact between the Allen key and the spring pin of the first-described embodiment of the invention. An alternate bore 38 for the key 35 also has been provided.

Figure 8:
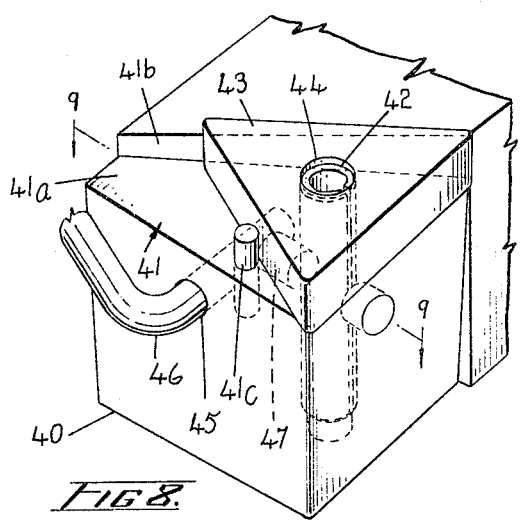
FIG. 8 is a fragmentary broken away perspective view of a fourth embodiment of a cutting tool constructed in accordance with the invention.
Figure 10:
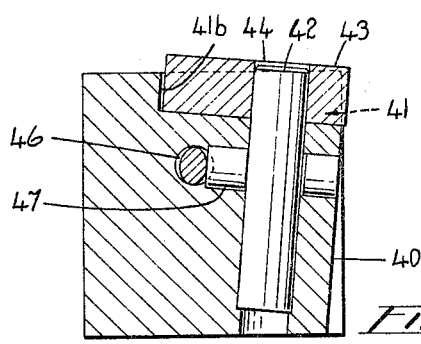
FIG. 10 is a vertical section through the line 10—10 of FIG. 9.
Figure 9:
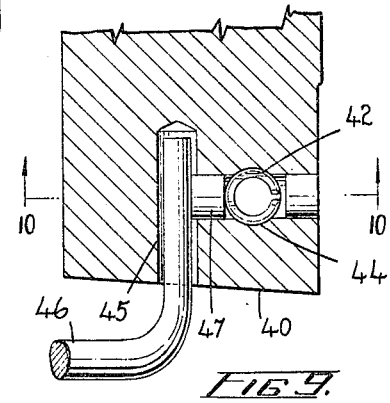
FIG. 9 is a horizontal section through the line 9—9 of FIG. 8.

In the embodiment illustrated in FIGS. 8, 9 and 10 there is provided a cutting tool which includes a head 40 in which is an open recess generally indicated at 41 and having a base 41a and an abutment constituted by a wall 41b and a pier 41c in the form of a dowel and spaced from the wall a spring pin 42 is secured in a bore provided in the head, and it has a free portion which extends above the base 41a.

A cutting insert 43 having a central hole 44 is positioned in the open recess, with the free portion of the spring pin 42 registering in the hole 44. The cutting insert 43 is polygonal; more specifically, it is triangular in cross-section. Thus, the peripheral surface of the cutting insert is constituted by a series of flat discontinuous edges, and one of the aforesaid edges bears against the wall 41b while an adjacent edge bears against the pier 41c, the said one edge and the adjacent edge of the insert 40 together constituting the portion of the peripheral surface of the insert which bears against the abutment.

Extending into the head transversely relative to the spring pin 42 is a bore 45 which receives a key 46 of elliptical cross-section. Interposed between the bore 45 and the spring pin 42 in a suitable passage is a plunger 47. In order to deflect the spring pin 42 so as to enable the cutting insert to be released therefrom, the key 46 is rotated by approximately 90°, as has been described in connection with the other embodiments, thus pushing the plunger 47 which in turn deflects the spring pin 42.

It should be noted that the type of spring pin which may be used with the invention is not critical. Roll-pins have been illustrated in connection with three of the embodiments described, while a solid spring pin has been illustrated in connection with the other embodiment. Needless to say, these spring pins are interchangeable.

Two types of cutting inserts have been illustrated, namely square ones and a triangular one. Cutting inserts of various other configurations which are well known in the art, can equally well be utilized with the invention.

It will be understood that the form of the invention herewith shown and described is a preferred example, and that various modifications can be carried out without departing from the spirit of the invention or the scope of the appended claims.

What I claim as my invention is:

1. A cutting tool comprising a tool holder having a shank and a head, the head having an open recess to receive a cutting insert provided with opposed faces and with a peripheral surface which defines the edges of the opposed faces, a hole extending through the cutting insert transversely of the opposed faces, the open recess being defined by a base and by an abutment, the cutting insert resting in the open recess with a portion of its peripheral surface bearing against the abutment, a spring pin fast within the head and having a free portion protruding from the base and into engagement with the periphery of the hole in the cutting insert, the spring pin being loaded to urge the cutting insert toward the abutment so that a portion of the peripheral surface of the cutting insert bears against the abutment, and means engageable with the pin to relieve the load therefrom and thus to release the cutting insert from engagement with the abutment.

2. A cutting tool as claimed in claim 1, in which the spring pin is of sheet metal rolled into a tubular form which in cross-section is of split-ring shape.

3. A cutting tool as claimed in claim 1, in which the spring pin comprises a rod inserted in a hole in the head, the hole being slightly larger than the rod except adjacent the end where the rod is fast in the hole, the rod thus being free to deflect slightly when a load is applied to it.

4. A cutting tool comprising a tool holder having a shank and a head, the head having an open recess to receive a cutting insert provided with opposed faces and with a peripheral surface which defines the edges of the opposed faces, a hole extending through the cutting insert transversely of the opposed faces, the open recess being defined by a base and by an abutment, the cutting insert resting in the open recess with a portion of its peripheral surface bearing against the abutment, a spring pin fast within the head and having a free portion protruding from the base and into engagement with the periphery of the hole in the cutting insert, the spring pin being loaded to urge the cutting insert toward the abutment so that a portion of the peripheral surface of the cutting insert bears against the abutment, means in the head adjustable relative to the spring pin to a first position where the spring pin remains loaded and to a second position where it engages and deflects the spring pin to disengage the spring pin from the cutting insert and thus to release the cutting insert from the abutment.

5. A cutting tool comprising a tool holder having a shank and a head, the head having an open recess to receive a cutting insert provided with opposed faces and with a peripheral surface which defines the edges of the opposed faces, a hole extending through the cutting insert transversely of the opposed faces, the open recess being defined by a base and by an abutment, the cutting insert resting in the open recess with a portion of its peripheral surface bearing against the abutment, a spring pin fast within the head and having a free portion protruding from the base and into engagement with the periphery of the hole in the cutting insert, the spring pin being loaded to urge the cutting insert toward the abutment so that a portion of the peripheral surface of the cutting insert bears against the abutment, an opening being provided in the head on the same side of the spring pin as the abutment, and cam means including a cam-surfaced rod insertable in the opening when angularly positioned to a first position, the inserted rod being rotatable to a second position where the cam means engages and deflects the spring pin to disengage the spring pin from the cutting insert and thus to release the cutting insert from engagement with the abutment.

6. A cutting tool comprising a tool holder having a shank and a head, the head having an open recess to receive a cutting insert provided with opposed faces and with a peripheral surface which defines the edges of the opposed faces, a hole extending through the cutting insert transversely of the opposed faces, the open recess being defined by a base and by an abutment, the cutting insert resting in the open recess with a portion of its peripheral surface bearing against the abutment, a spring pin fast within the head and having a free portion protruding from the base and into engagement with the periphery of the hole in the cutting insert, the spring pin being loaded to urge the cutting insert toward the abutment so that a portion of the peripheral surface of the cutting insert bears against the abutment, a bore being provided in the head and being so positioned therein relative to the spring pin that a segment of the periphery of the bore interferes with a portion of the surface of the spring pin, and a cam-surfaced rod insertable in the bore when angularly positioned to a first portion, the inserted rod being rotatable to a second position where it engages the aforementioned interfered surface of the pin to disengage the pin from the cutting insert and thus to release the cutting insert from engagement with the abutment.

7. A cutting tool comprising a tool holder having a shank and a head, the head having an open recess to receive a cutting insert provided with opposed faces and with a peripheral surface which defines the edges of the opposed faces, a hole extending through the cutting insert transversely of the opposed faces, the open recess being defined by a base and by an abutment, the cutting insert resting in the open recess with a portion of its peripheral surface bearing against the abutment, a spring pin fast within the head and having a free portion protruding from the base and into engagement with the periphery of the hole in the cutting insert, the spring pin being loaded to urge the cutting insert toward the abutment so that a portion of the peripheral surface of the cutting insert bears against the abutment, a bore being provided in the head on the same side of the spring pin as the abutment, a cam-surfaced rod insertable in the bore when angularly positioned to a first position, a load-carrying element interposed between the spring pin and the bore, the inserted rod being rotatable to a second position where it bears against the element which in turn engages the pin to disengage the pin from the cutting insert and thus to release the cutting insert from engagement with the abutment, the element applying no load to the pin when the rod is in the first position.

8. A cutting tool comprising a tool holder having a shank and a head, the head having an open recess to receive an anvil and a cutting insert each provided with opposed faces and with a peripheral surface defining the edges of the opposed faces, a hole extending through the anvil and a hole extending through the cutting insert transversely of the opposed faces, the open recess being defined by a base and by an abutment, a face of the cutting insert bearing on one face of the anvil, the anvil and the cutting insert which bears on it both resting in the open recess with the other face of the anvil bearing on the base of the recess, the portion of the peripheral surface of the anvil adjacent the abutment having clearance from the abutment, a spring pin fast within the head and having a free portion protruding from the base and into the holes in the anvil and in the cutting insert, the spring pin being loaded to urge the cutting insert towards the abutment so that a portion of the peripheral surface of the cutting insert bears against the abutment, a bore being provided in the head on the same side of the spring pin as the abutment, the bore being so positioned relative to the adjacent portion of the peripheral surface of the anvil that the bore interferes with the said adjacent portion of the peripheral surface of the anvil, a cam-surfaced rod insertable in the bore when it is angularly positioned to a first position, the inserted rod being rotatable to a second position where it bears against the aforementioned interfered peripheral surface of the anvil which in turn engages the pin to disengage the pin from the cutting insert and thus to release the cutting insert from engagement with the abutment, the anvil applying no load to the pin when the rod is in the first position.

9. A cutting tool as claimed in claim 1, in which the cutting insert is polygonal so that its peripheral surface is constituted by a series of flat discontinuous edges, and in which the abutment is provided by a wall and by a pier spaced from the wall, one of the aforesaid edges bearing against the wall and an adjacent edge bearing against the pier, the said one edge and the said adjacent edge together constituting the portion of the peripheral surface of the insert which bears against the abutment.

No references cited.

WILLIAM W. DYER, JR., *Primary Examiner.*

HARRISON HINSON, *Examiner.*